United States Patent
Korathu-Larson

(10) Patent No.: US 11,612,197 B2
(45) Date of Patent: Mar. 28, 2023

(54) APPARATUS WITH FASTENERLESS CONNECTION BETWEEN COMPONENTS AND ASSEMBLY METHOD THEREOF

(71) Applicant: Rory Korathu-Larson, LLC, Seattle, WA (US)

(72) Inventor: Rory Korathu-Larson, Seattle, WA (US)

(73) Assignee: Rory Korathu-Larson, LLC, Seattle, WA (US)

( * ) Notice: Subject to any disclaimer, the term of this patent is extended or adjusted under 35 U.S.C. 154(b) by 315 days.

(21) Appl. No.: 16/942,532

(22) Filed: Jul. 29, 2020

(65) Prior Publication Data

US 2021/0307414 A1    Oct. 7, 2021

Related U.S. Application Data

(60) Provisional application No. 63/100,825, filed on Apr. 3, 2020.

(51) Int. Cl.
   *A41D 13/11*    (2006.01)
   *A62B 18/08*    (2006.01)
   (Continued)

(52) U.S. Cl.
   CPC ...... *A41D 13/1107* (2013.01); *A41D 13/1161* (2013.01); *A42B 7/00* (2013.01);
   (Continued)

(58) Field of Classification Search
   CPC .... A41D 13/11–1192; A62B 23/00–02; A62B 7/10; A62B 9/04; A62B 18/02–025; A62B 18/08; A62B 18/088; A62B 19/00; F16B 1/00; F16B 2001/0092; F16B 2/00–06; F16B 4/004; F16B 5/00–0012; F16B 5/008; F16B 5/0092; F16B 5/0621–0657; F16B 2005/0671; F16B 2005/0678; F16B 5/10; F16B 21/02;
   (Continued)

(56) References Cited

U.S. PATENT DOCUMENTS 3,327,581 A * 6/1967 Schlueter ................ F16B 21/02
                                                    361/807
4,632,195 A * 12/1986 Emmerich ............ E21B 17/046
                                                    403/383

(Continued)

*Primary Examiner* — Rachel T Sippel
(74) *Attorney, Agent, or Firm* — Lee & Hayes, P.C.

(57) ABSTRACT

An apparatus having components that are interconnectable without fasteners. A first component includes a male connection portion including a connection wall defining a non-circular, closed-geometric shape, and one or more grooves extending along a least a portion of an outer side of the connection wall. A second component includes a female connection portion including a capture wall defining a shape within which the connection wall fits in a first orientation and a second orientation. The second orientation is a fastened state achieved via a rotational twist action of the first component with respect to the second component. One or more protrusions extend inwardly from the capture wall. The one or more protrusions are sized to engage the one or more grooves of the connection wall of the first component when the connection wall is oriented in the second orientation within the capture wall.

19 Claims, 12 Drawing Sheets

(51) Int. Cl.
    *A62B 23/02*       (2006.01)
    *A62B 9/04*        (2006.01)
    *F16B 1/00*        (2006.01)
    *A42B 7/00*        (2006.01)
    *B33Y 80/00*      (2015.01)

(52) U.S. Cl.
    CPC ............... *A62B 9/04* (2013.01); *A62B 18/08* (2013.01); *A62B 23/02* (2013.01); *A41D 2300/30* (2013.01); *B33Y 80/00* (2014.12); *F16B 1/00* (2013.01)

(58) Field of Classification Search
    CPC .............. F16B 21/04; Y10T 403/7005; Y10T 403/7007; B65D 39/10; B65D 43/0229; B65D 41/06
    See application file for complete search history.

(56) References Cited

U.S. PATENT DOCUMENTS

| | | | | |
|---|---|---|---|---|
| 5,158,217 A | * | 10/1992 | Huminsky | B22D 41/502 164/138 |
| 5,482,417 A | * | 1/1996 | Erickson | B23B 31/107 411/324 |
| 2005/0281613 A1 | * | 12/2005 | Tella | F16D 1/072 403/348 |

\* cited by examiner

APPARATUS WITH FASTENERLESS CONNECTION BETWEEN COMPONENTS AND ASSEMBLY METHOD THEREOF

CROSS REFERENCE TO RELATED PATENT APPLICATIONS

This application claims the benefit of priority from U.S. Provisional Patent Appln. No. 63/100,825 filed on Apr. 3, 2020, and incorporates the same in its entirety by reference.

BACKGROUND

Typically, the simpler the design of a product, the more easily manufactured and in some cases, even more easily obtained. Nevertheless, simplicity alone does not necessarily equate to availability of the product of ease of procurement. Occasionally, a massive need arises for a single type of product, for a variety of reasons. In those moments, an individual may have a few options of obtaining one of the products. However, even with a few options, it is possible that those options may be limited in the speed, the quantity, the type, the size, the quality, the color, etc. of which the product might be obtained. In such situations, it can be frustrating to not have access to a product desired or needed at such times.

In modern times, the emerging consumer-level availability of a 3D printer provides an opportunity to possibly relieve some of that frustration by providing consumers yet another option for obtaining a product desired at any given time. While, of course, there remain some limitations with respect to materials available and capable of being manipulated, it is at least potentially possible that a person may be able to make their own version of the product using a 3D printer.

However, even with the advances of 3D printer technology and the possibilities for a user to create one's own products, some engineering challenges remain for various products. For example, there may be components of the products that are not yet capable of 3D printing, and/or components used with the product that may need periodic extrication from within a 3D printed product, for replacement or cleaning. Consider, for example, a product that includes a cavity in which a secondary component—not capable of being printed directly with the product—is intended to be inserted. In some instances, it is contemplated that a cavity may be completely enclosed, whether for reducing the volume and mass of material of the product or merely simplicity, such as a shell shape of a figurine. Alternatively, a cavity may be partially enclosed, such as a tank or other chamber having one or more apertures, such as an inlet and an outlet. While it may be possible to print such cavitous products as a monolithic unit, in the case of completely enclosed product that requires an insert (even once), one would have to break such a unit to insert into, or remove from, the cavity a secondary component. Likewise, in the case of a partially enclosed product, if the insert is larger than an aperture therein, again, the product would need to be broken to allow the inserted component.

In an effort to avoid the above problem, the cavity in a product may be enclosable. For example, the cavity portion of the product may be made by printing two or more pieces, which may be connected to each other and disconnected from each other, as needed, to permit insertion or removal of a secondary component. Nevertheless, even in this type of product, the manner of connection between the pieces may create an additional challenge because the connection may require additional hardware, such as construction tools or other materials, e.g., screwdrivers, screws, adhesives, or other fasteners, etc., to assemble the pieces.

Moreover, even in the case of non-cavitous products, a means of connecting two or more pieces of a product generally involves some form of additional fastener element. Such additional fasteners necessarily increase the cost and complexity of the products.

Finally, threaded bottle caps that fit on bottles without necessitating additional separate fasteners to maintain the engagement (in some instances) are known, as well as other generally circular-shaped means of engagement between two correspondingly sized cylindrical components, such as lengths of some forms of piping, for example. However, such circular engagements may require multiple rotations (e.g., helical bottle threads) and/or matched alignment between the helical engaging threads or other protruding teethlike or tabular structures that align with gaps built into structural segments that protrude from the walls of mating components to receive the.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

DETAILED DESCRIPTION

Overview

Figure 1A:
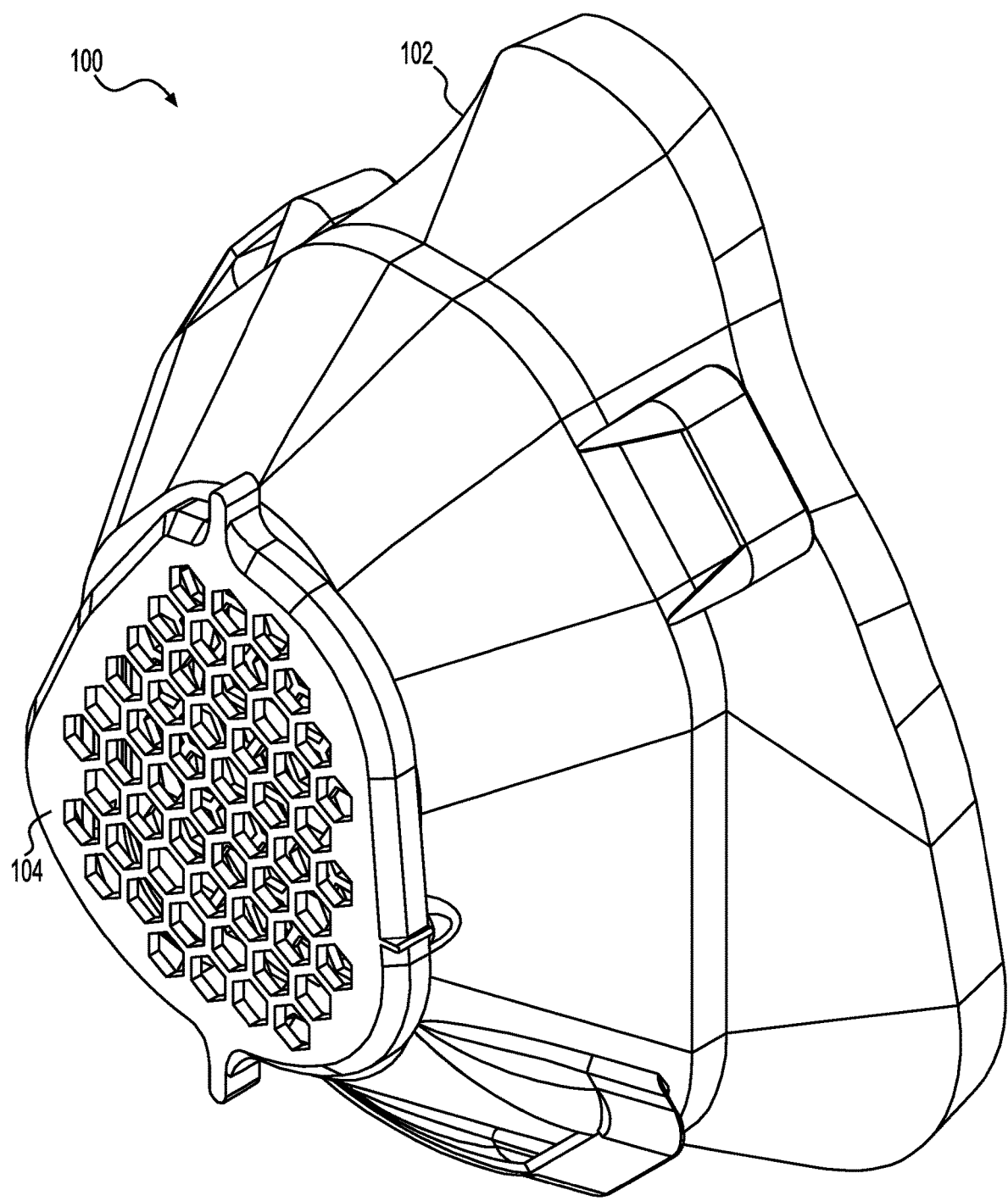
FIG. 1A illustrates a perspective view of a facemask, as an example of an assembled apparatus implementing a fastenerless connection between components, according to an embodiment of this disclosure.
Figure 1B:
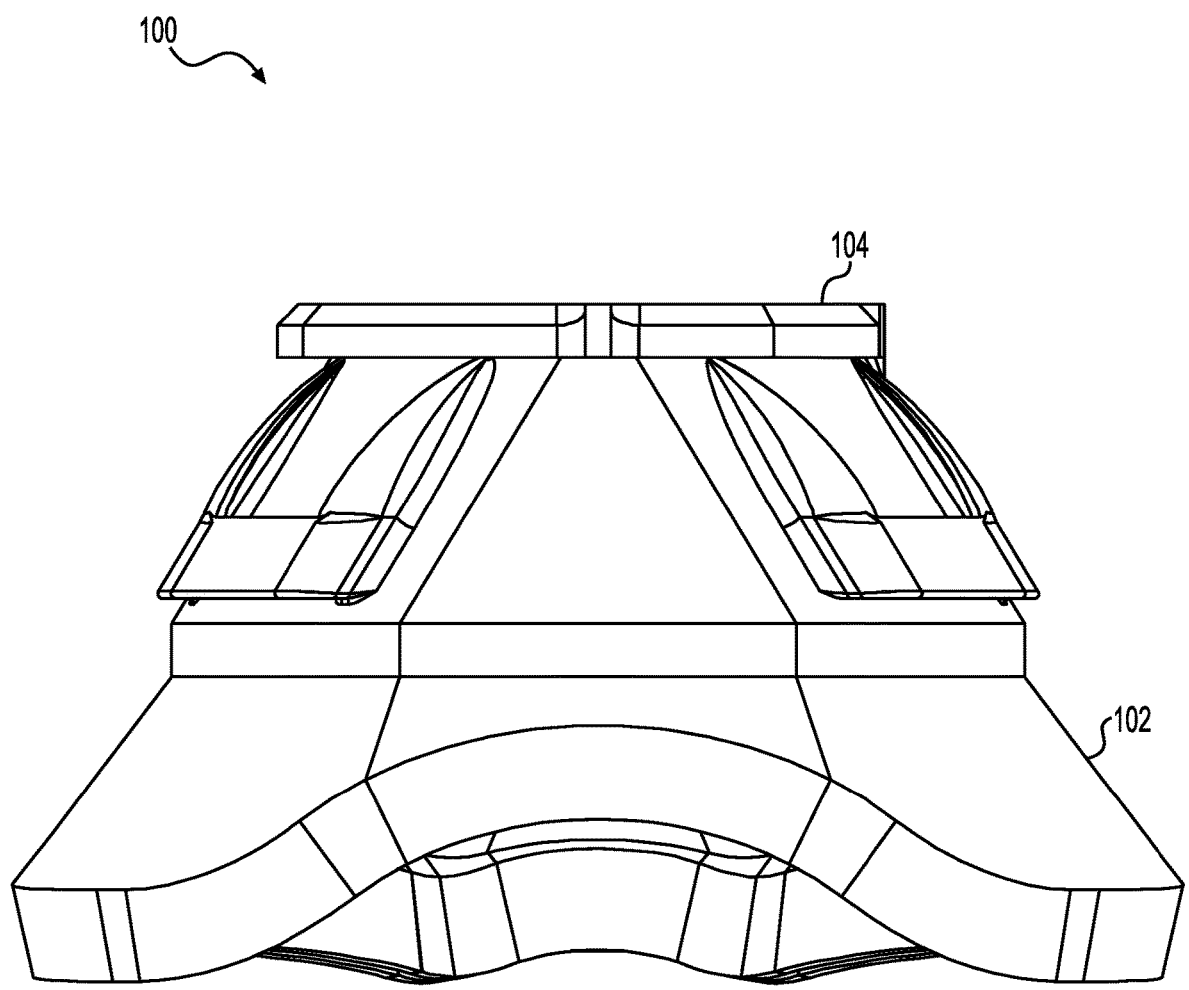
FIG. 1B illustrates a bottom view of the assembled apparatus of FIG. 1A according to an embodiment of this disclosure.
Figure 1C:
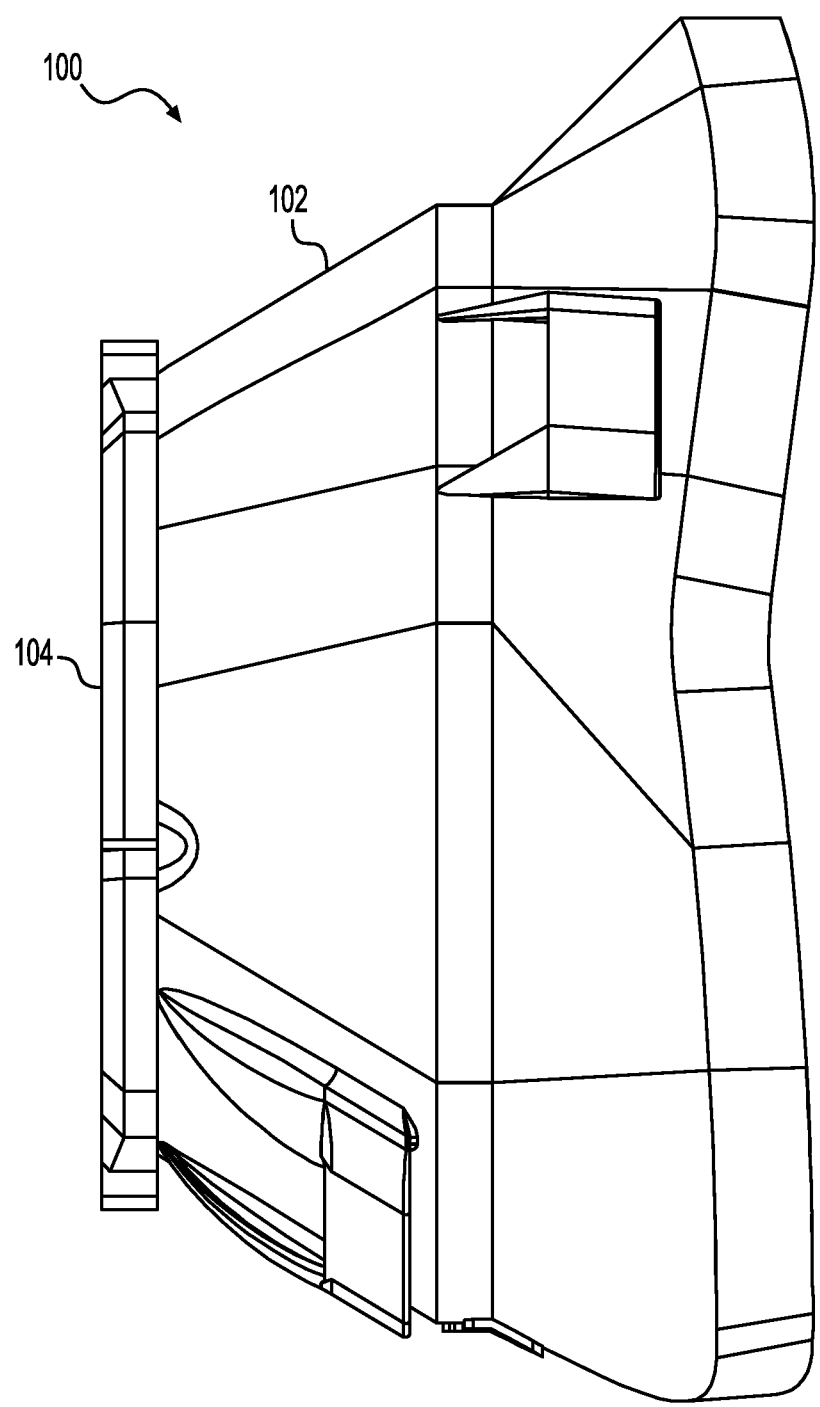
FIG. 1C illustrates a side view of the assembled apparatus of FIG. 1A according to an embodiment of this disclosure.
Figure 1D:
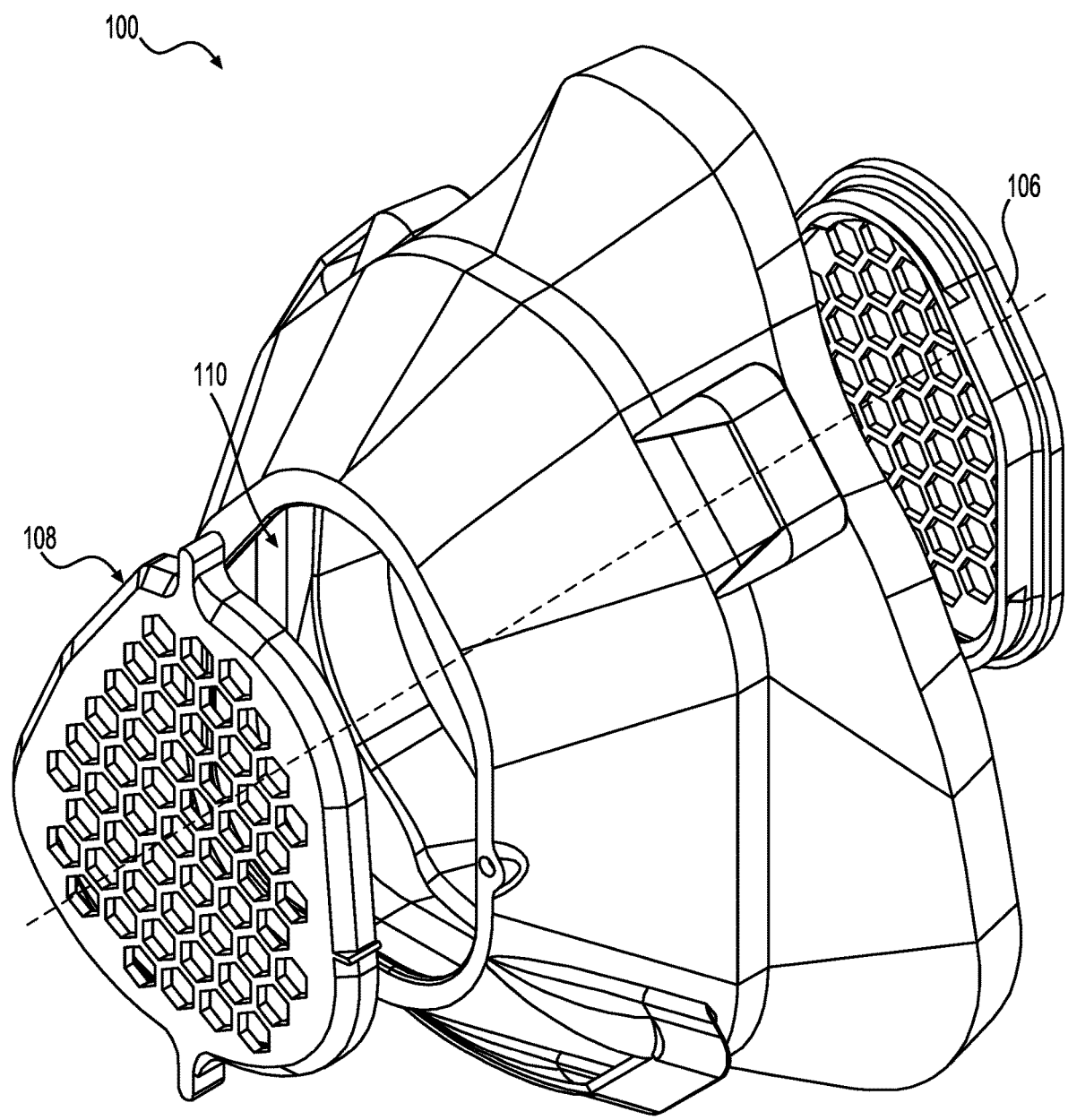
FIG. 1D illustrates an exploded perspective view of the apparatus of FIG. 1A according to an embodiment of this disclosure.
Figure 1E:
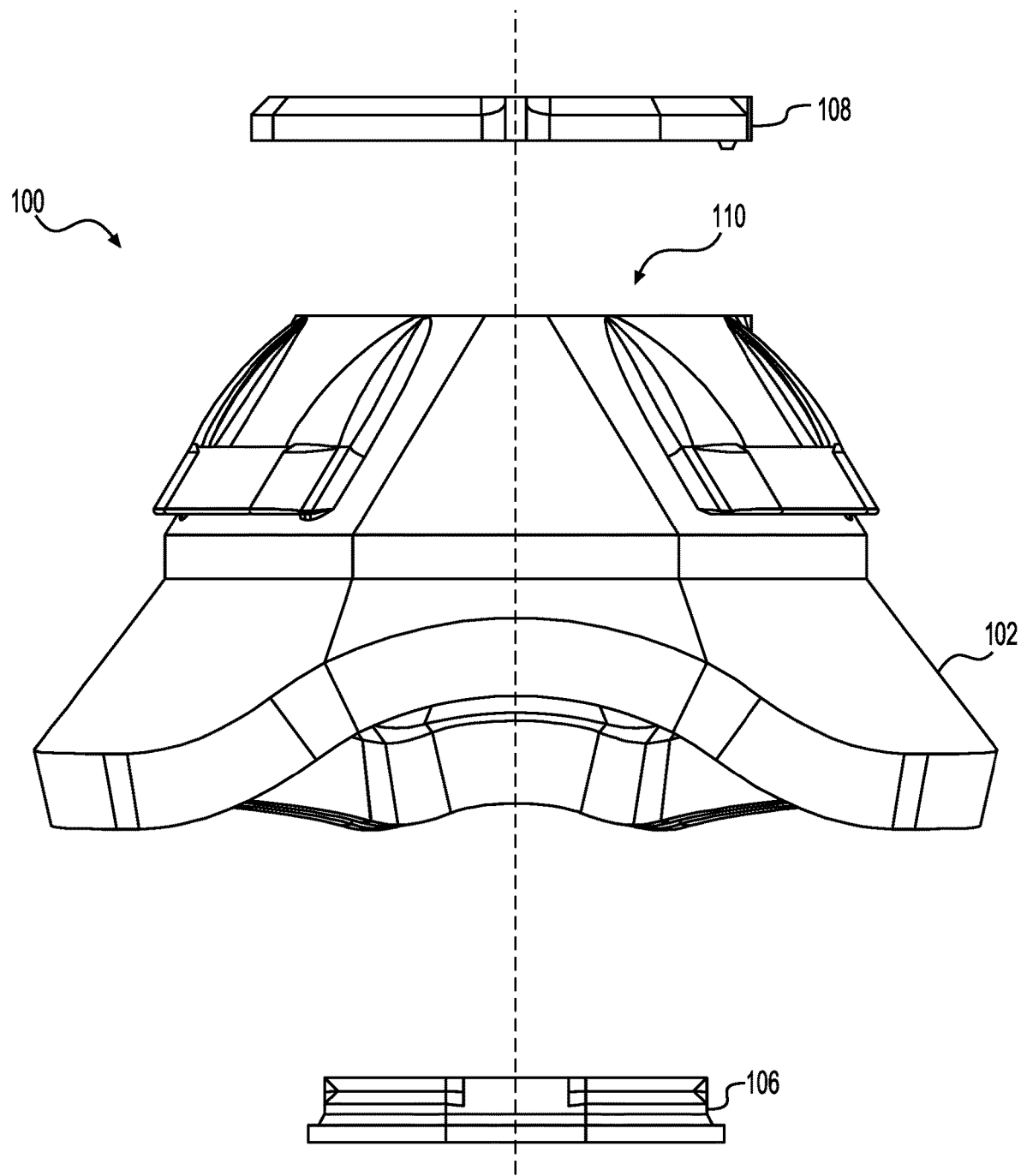
FIG. 1E illustrates an exploded bottom view of the apparatus of FIG. 1A according to an embodiment of this disclosure.
Figure 1F:
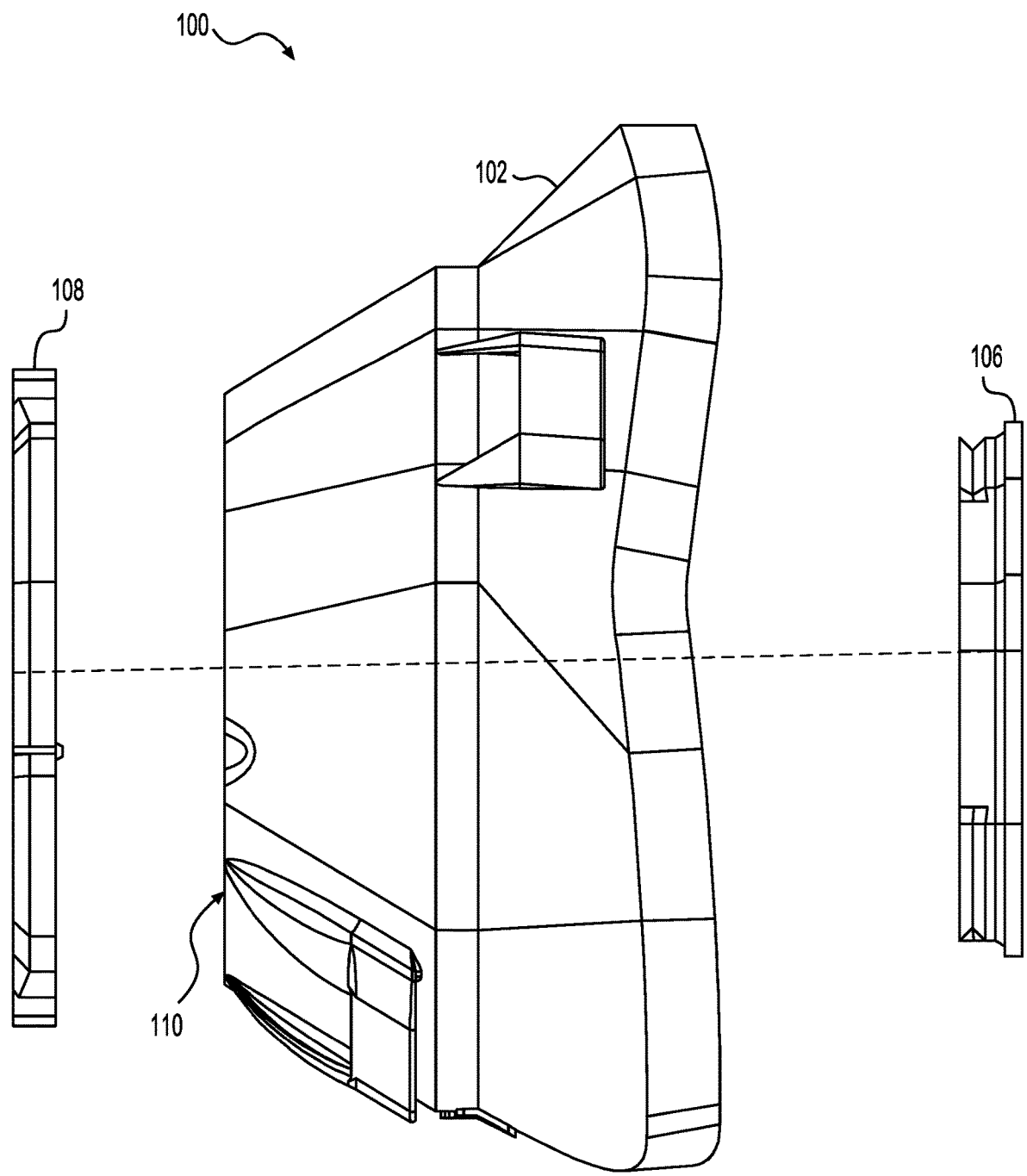
FIG. 1F illustrates an exploded side view of the apparatus of FIG. 1A according to an embodiment of this disclosure.

This disclosure is directed to an apparatus with a fastenerless connection between components and an assembly method thereof. Though it is recognized that a solution, as described herein, for achieving such a product is applicable to non-3D printed products, one or more embodiments of fastenerless connection between components that are 3D printable products are particularly described herein.

Accordingly, the figures herein depict a safety facemask as an example embodiment of an apparatus with a fastenerless connection between components. In general, where there is an increased risk of contracting a virus or suffering agitative health effects caused by an element (e.g., contagion, particle of irritant, or other toxic particle) in the environment (i.e., public space or private space), such as during a health pandemic, it is common for people to desire to wear protective facemasks. Moreover, when this need has been unexpected, many people may be caught empty-handed and without a facemask. Further, an individual may be unable to get one due to the widespread demand and priority being given to healthcare workers and other government-driven prioritization of such supplies.

While the average facemask is not a foolproof form of protection from all possible contaminants, facemasks still may provide protection from many airborne and/or touch-transferable contaminants since facemasks cover two of the main entry points to the body via which many contaminants are most capable of entering. It is known, of course, that across the variety of facemasks, a varying level of quality exists to assist in minimizing the intake of an infectious contagion. For example, a handsewn facemask made of a cotton or other fabric may be satisfactory for some uses. However, advances in facemasks are known, and a version having materials with more bacteria resistant properties and better filtering, as well as the ability to have a valved one-way input and a valved one-way output are considered superior and, thus preferable to a simple fabric facemask.

Therefore, in an embodiment, a 3D printable facemask is described herein. The facemask is merely an example product that implements the disclosed fastenerless connection between components, and thus it is understood that the scope of protection sought in this application may extend beyond a facemask as disclosed, to a multitude of products capable of implementing the same or similar fastenerless connections. The facemask, therefore, may be referred to herein simply as "apparatus." Though it is contemplated that "apparatus" may be further defined expressly as a facemask or other specific products, whether 3D printable or manufactured by other means.

Illustrative Embodiments of an Example Apparatus with a Fastenerless Connection Initially, it is noted that inasmuch as a desired scope of protection for this disclosure is to define the applicability of the innovative fastenerless connection feature with respect to numerous possible apparatuses, this specification does not intend to describe every possible variation of other features accompanying the depicted apparatus or different—and particularly non-depicted—apparatuses.

FIGS. 1A-1F depict various orientations of an apparatus 100 (a facemask), in both a fully assembled view and an exploded view to more clearly illustrate the components of the apparatus 100 and their respective orientations when assembled. An apparatus 100, according to the instant disclosure, includes at least two interconnectable components. Here, the apparatus 100 includes a body 102 (also referred to as a "main body" or a "mask body" 102, as a component of the example apparatus/product explained herein) and a sub-assembly component 104 (also referred to as a "filter assembly" 104, as a component of the example apparatus/product explained herein). The sub-assembly 104 may include at least a first component 106 and a second component 108, as described further herein with respect to FIGS. 1D-1F and more detailed with respect to FIGS. 2A, 2B, 3A, 3B, 4A, and 4B.

The body 102 of a facemask as the apparatus may be include curved or angled continuous walls to form a convex shape to cover a nose and mouth and may be scaled in size for users of different sizes. In this embodiment, despite the body 102 having a flange, defining an opening 110, being intentionally entrapped by the sub-assembly component 104, the form of "engagement" between the flange of the body 102 and the sub-assembly component 104 is incidental and due to the outer shapes of the sub-assembly component 104, and is not affected by the fastenerless connection feature embodied within the sub-assembly component 104. That is, the structure of the body 102 is not involved in the engagement of the fastenerless connection structure. Nevertheless, it is contemplated that a portion (as explained below) of the fastenerless connection structure may be manufactured integrally into a wall or structural aspect of the body of a variation (not shown) of the depicted apparatus or other apparatuses.

Moreover, it is contemplated that an apparatus may include structural features that provide extraneous functions. Note that neither the depicted walls of the body 102, nor the tether loops on the outside of the walls are annotated in the figures with a reference number. That is, for example, the body 102 of a facemask may include features such as custom-shaped walls to correspond to a wide face or a narrower face, and/or tether loops fixed (or built in monolithically) on the walls via which the facemask may be secured to the face using straps. However, though an apparatus may have features for functions that are useful, for the purposes of this disclosure, secondary or auxiliary features not involved in the fastenerless connection feature are of less concern.

The apparatus 100 may be manufactured in many ways. However, the ability to instantly manufacture different sizes of an apparatus for different users, using a 3D printer (as mentioned above), is particularly useful for a mask that may need to fit a child versus a mask for an adult, for example.

In FIGS. 1A-1F, the first component 106 and the second component 108 of the sub-assembly component 104 are illustrated from various angles and positions. As shown in the exploded assembly views of FIGS. 1D-1F, the first component 106 is disposed in a linear alignment with the second component 108. In the embodiment depicted, a structure of the first component 106 may have a generally planar shape and be oriented such that a first plane therethrough extends in a first direction. Further, in an embodiment, the second component may also have a generally planar shape and be oriented such that a second plane therethrough extends in the first direction, whereby such that the first and second planes are substantially parallel. Thusly oriented, when brought together in engagement, the first and second components 106, 108 are secured together through the opening 110 in the body 102, as indicated above, thereby securing the sub-assembly component 104 to the body 102.

It is noted that the general shapes of a first and second component of a sub-assembly component need not be generally planar. That is, the first and second components may each have different and/or unique, non-planar shapes. However, to engage, at least the engaging portions of each (discussed further below) are aligned in a substantially parallel orientation to be moved into a first position of the engagement.

Figure 2A:
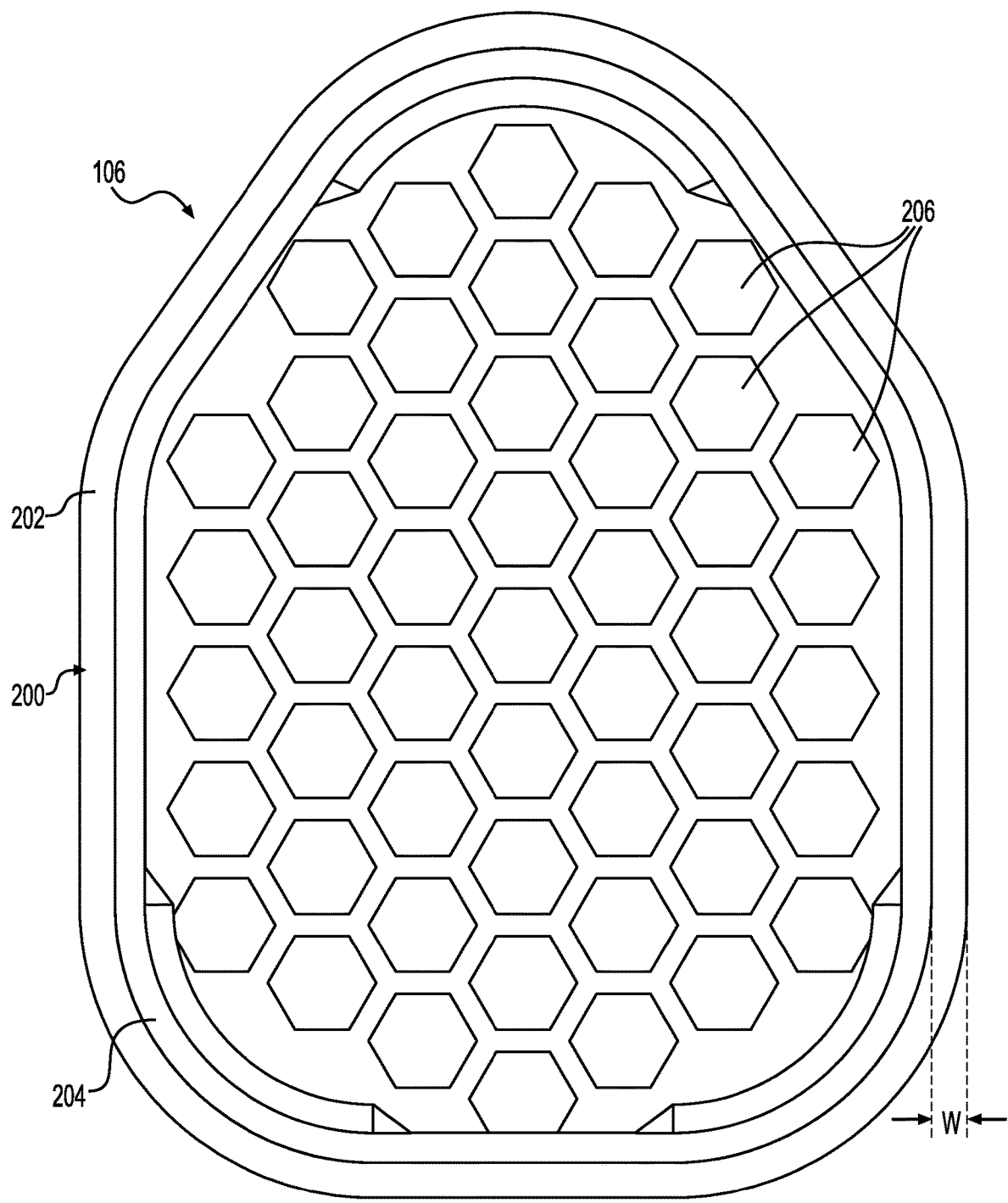
FIG. 2A illustrates a front view of a tray of the facemask depicted in FIGS. 1A-1F, as an example component of an apparatus having a fastenerless connection portion, according to an embodiment of this disclosure.
Figure 2B:
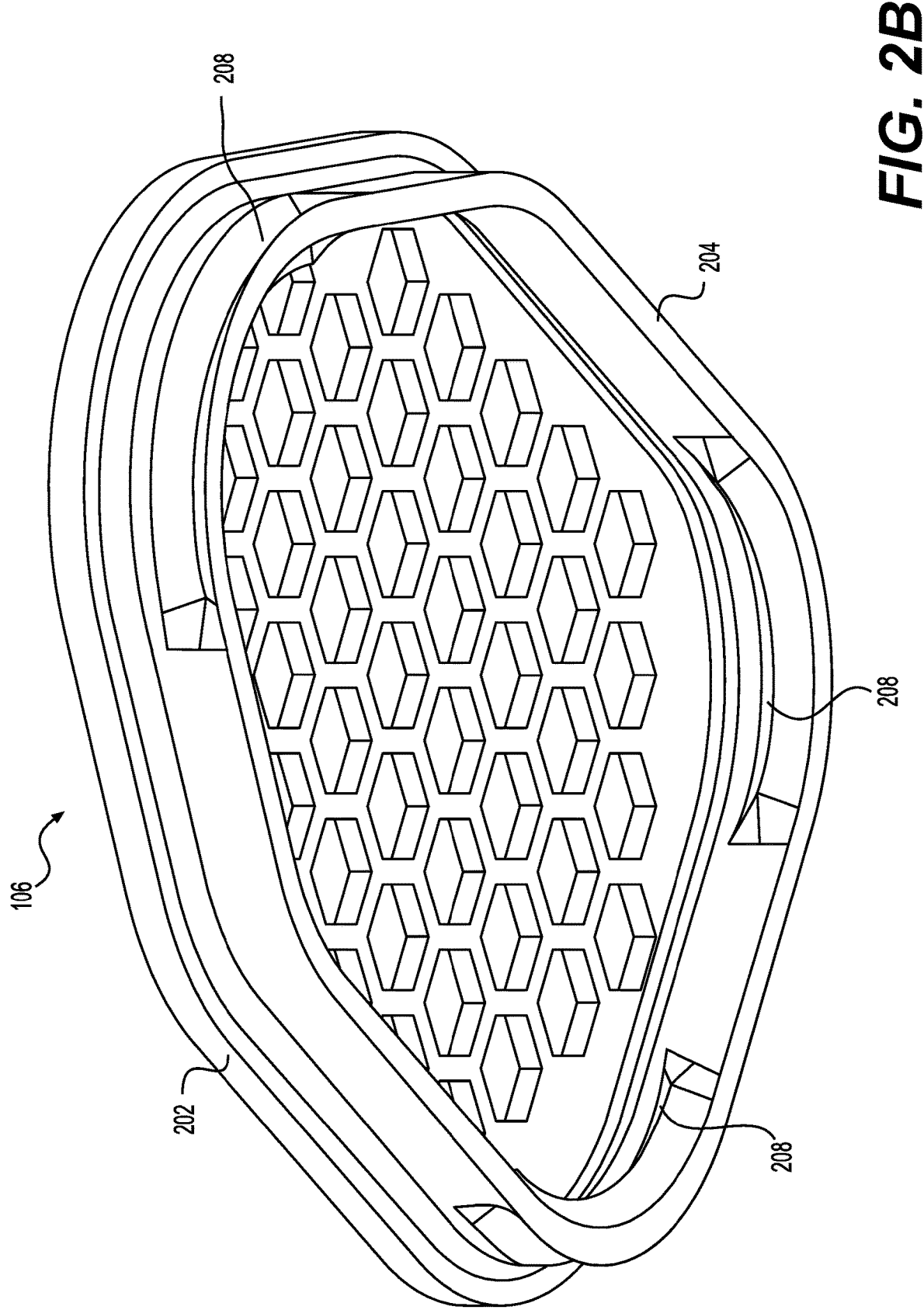
FIG. 2B illustrates a perspective view of the tray of the facemask depicted in FIG. 2A, according to an embodiment of this disclosure.

In FIGS. 2A and 2B, additional aspects of the fastenerless connection feature are more clearly shown and defined. The first component 106 includes a body 200 (e.g., a tray of the example apparatus/product), which may be formed in many shapes, including the tray shape shown. The body 200 may be defined, at least in part, by a backing structure 202 (e.g. back panel 202) and a connection wall 204 extending along the backing structure 202. In an embodiment, the backing structure 202 may include a plurality of through holes 206. The through holes 206 are of particular use for the example component of a filter tray of a facemask, whereby a user may inhale in air (or exhale air out, depending on the type of filter). The connection wall 204 rises from a surface of the backing structure 202 in a direction that is transverse to the surface of the backing structure 202. In an embodiment, the direction of extension may be as it appears in FIGS. 2A and 2B to be orthogonal or substantially orthogonal to the surface of the backing structure 202.

For the purposes of this disclosure, it is considered to be understood by those skilled in the art that the term "transverse" means that the direction of extension of the connection wall 204 includes any direction other than parallel to the backing structure 202. Further, it is considered to be understood by those skilled in the art that the term "substantially" in this context indicates that the direction of extension of the connection wall 204 extends at an angle that ranges between 10 degrees in either direction of being orthogonal to the backing structure 202 (i.e., the angle between adjacent surfaces of the back panel 202 and the connection wall 204 may vary from 80° to 100°).

The connection wall 204 may follow a path of a perimeter of the backing structure 202 so as to be a perimeter wall that extends around the outer border of the backing structure 202. Further, the connection wall 204 may be one continuous wall structure (as depicted) or an aligned set (plurality) of discontinuous wall segments (not depicted) that track along a perimeter line of the backing structure 202. Alternatively, as shown, the connection wall 204 may be a wall (continuous or discontinuous) that closely tracks approximately, but is not definitive of, the outermost perimeter around the backing structure 202, as is depicted in FIG. 2A. In this alternative embodiment, a portion of the backing structure 202 extends a distance beyond an outer side of the connection wall 204 by a predetermined width 'w'. Note that while the width w of the portion of the backing structure 202 shown in FIG. 2A appears to be substantially constant around an entirety of the connection wall 204, it is understood that the width w may vary along the component, and need not be a constant width.

Moreover, in an alternative embodiment contemplated as within the scope of this disclosure, the connection wall may follow an endless pathway that does not track a perimeter line of the backing structure at all. In other words, the connection wall may extend along a portion of the body of the first component that does not mirror an underlying shape or outline of the backing structure of the first component at all. For example, it is contemplated that a component of an apparatus may include a diamond shaped connection wall, while the shape of the backing structure is oval shaped.

Regardless of the shape of the backing structure 202, the connection wall 204 rises therefrom and may define a non-circular, closed-geometric shape. For the purposes of this disclosure, the term "non-circular, closed-geometric shape" is defined as any shape having a continuously-definable border forming an endless pathway, for which the distance from the centroid of the shape to a point on the border is not constant for all points along the border (i.e., no constant radius, and thus no circles). Additionally, for the purposes of this disclosure, the shape formed by the connection wall is determined in a two-dimensional plane as the profile shape of the closed pathway followed by the connection wall. Thus, the non-circular, closed-geometric shape of the connection wall may be one of many shapes, including but not limited to: triangle, square, rectangle, pentagon, hexagon, rhombus, oval, diamond, star, irregular polygon, etc. Also, the sides of the shapes need not be equal in length, and the corners of the shapes may be arcuate rather than converging at a sharp intersecting angle between two adjacent lines of the sides of the shape. At least one benefit of using a non-circular, closed-geometric shape is to provide users with a quick, visually determinable way to respectively orient and connect the first component and the second component.

For example, in the depicted embodiment, the overall shape of the backing structure 202 is an irregular pentagon, and the connection wall 204 tracks approximate to, but is not on, the perimeter of the irregular pentagon shape of the backing structure 202. As such, a portion of the backing structure 202 extends flange-like, having the width 'w' around the connection wall 204, and defining the irregular pentagon shape of the body 202. Thus, as described further herein below, the irregular pentagon shape provides only a single orientation in which engagement is started.

In contrast, the engagement between a circular bottle cap and a correspondingly sized circular opening of a bottle may allow for essentially an infinite number of starting orientations, respectively. That is, though the cap and opening must be coaxially aligned along the center axis to connect, because the border is circular, a user might orient the cap and bottle opening respectively in distinct orientations each time the cap is removed. Further, depending on the type of engagement structures (e.g., threads, tabs, etc.) implemented in the example of the cap and bottle, occasionally, an additional amount of rotation is necessitated in order to cause the engagement structures hidden within the walls of the cap and bottle to engage properly. Thus, a user may find greater ease in connecting the first and second components of an apparatus having a fastenerless connection feature where the connection wall is a non-circular, closed-geometric shape, which provides fewer than infinite starting orientations for connection.

As indicated above, the connection wall 204 is involved in the engagement of the fastenerless connection feature. Furthermore, one or more grooves 208 may extend along a least a portion of an outer side of the connection wall 204. The one or more grooves 208 may be recessed from an otherwise planar edge surface of the connection wall 204, as shown in FIG. 2B. In an embodiment, the combination of the connection wall 204 and the one or more grooves 208 function together as a male connection portion.

Inasmuch as the first component 106 includes features that function as a male connection portion of the fastenerless connection feature, the second component 108 includes a corresponding female connection portion configured to connect with the male connection portion. The female connection portion is defined with respect to a body 300 (e.g., a cover of the example apparatus/product), which may be formed in many shapes, including the cover shape shown. Nevertheless, the shape of the body 300 is shaped to engage with the shape of the body 200 of the first component.

The body 300 may be defined, at least in part, by a backing structure 302 (e.g. front panel 302) and a capture wall 304 extending along the backing structure 302. In an embodiment, the backing structure 302 may include a plurality of through holes 306. The through holes 306 are of particular use for the example component of a filter cover of a facemask, whereby a user may inhale in air (or exhale air out, depending on the type of filter). The capture wall 304 rises from a surface of the backing structure 302 in a direction that is transverse to the surface of the backing structure 302. In an embodiment, the direction of extension may be as it appears in FIGS. 3A and 3B to be orthogonal or substantially orthogonal to the surface of the backing structure 302.

Figure 4A:
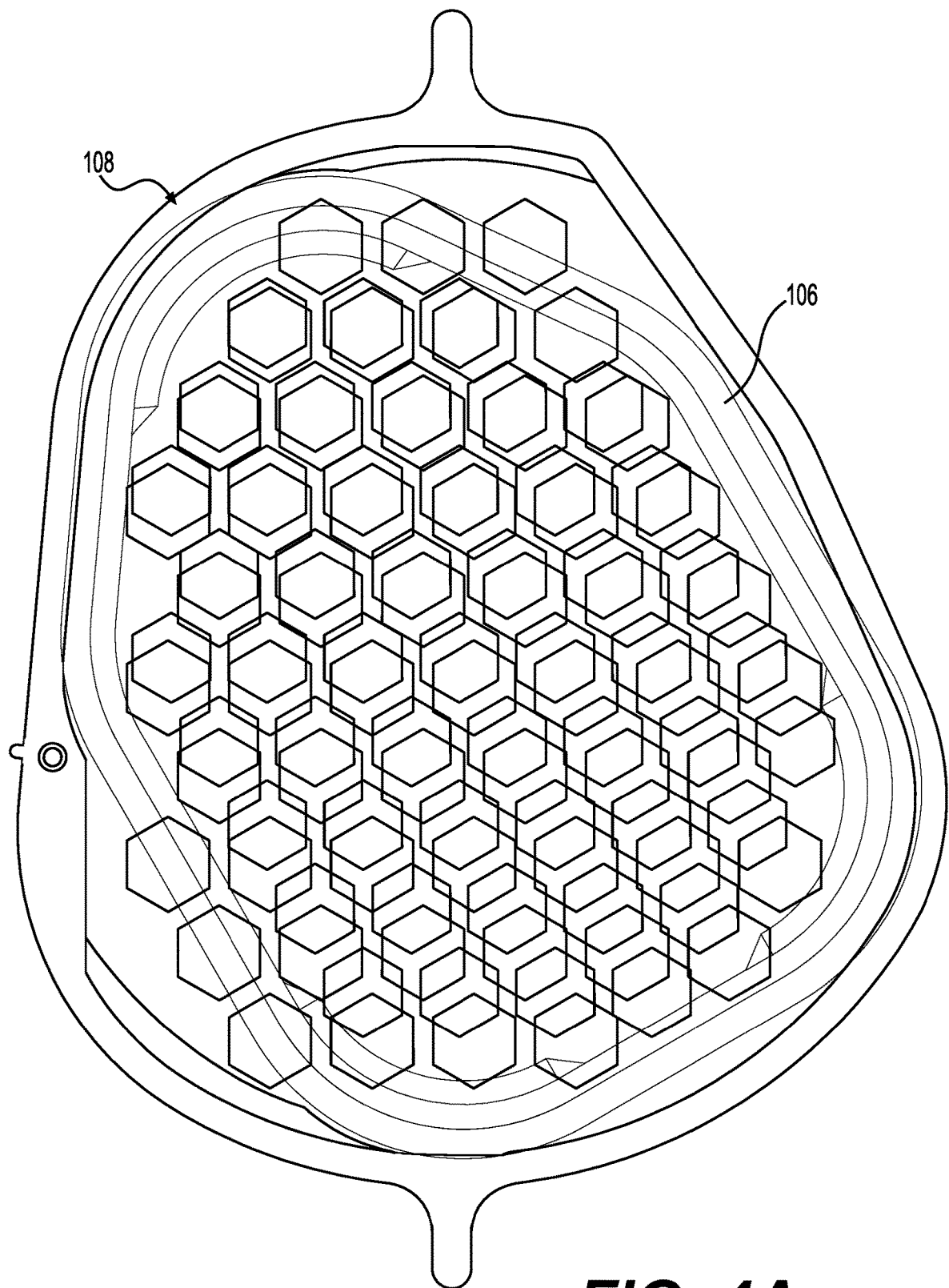
FIG. 4A illustrates a planar view of an overlay of the tray over the cover in the first orientation.
Figure 4B:
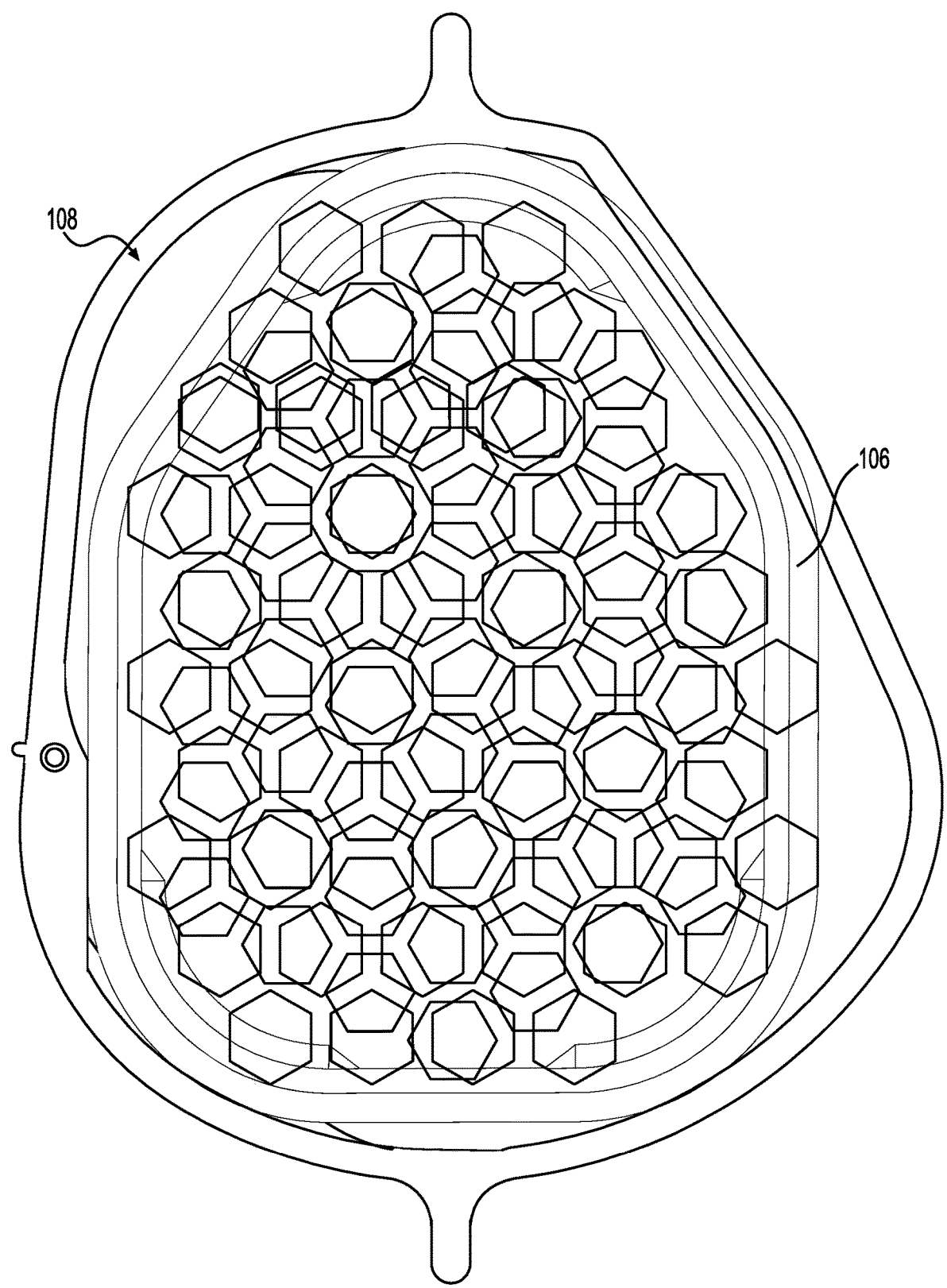
FIG. 4B illustrates a planar view of the overlay of the tray over the cover in the second orientation.

Moreover, the capture wall 304 defines a shape within which the connection wall 204 of the male connection portion fits in a first orientation (illustrated in FIG. 4A) and a second orientation (illustrated in FIG. 4B). Note, in FIGS. 4A and 4B, the first component 106 is shown only in lines, as transparent, in order to illustrate the relative orientation positions. The first orientation is an unfastened (i.e., disconnected) state between the first component 106 and the second component 108, and the second orientation is a fastened (i.e., connected) state achieved via a rotational twist action of the first component 106 with respect to the second component 108 after the first component 106 is fitted in the first orientation. Thus, in the engagement of the first component 106 and the second component 108, the union thereof forms a cavity therebetween. Furthermore, the first orientation and the second orientation are defined on a same plane such that a spatial proximity relationship between the first component 106 and the second component 108 remains constant when the first component 106 and the second component 108 are in the first orientation or in the second orientation. Thus, in this example of FIGS. 4A and 4B, the pentagonal shape of the tray is accommodated for connection in the overlapping placement of the cover over the tray such that the capture wall aligns with the connection wall first, and upon rotation the tray and the cover are moved into the secured/fastened position where the pentagonal shape of the tray is able to fit but unable to be removed in the linear separation direction (where the linear direction is orthogonal to each of the tray and cover.

As indicated above, the capture wall 304 is involved in the engagement of the fastenerless connection feature. Furthermore, one or more protrusions 308 may extend along a least a portion of an inner side of the capture wall 304. The one or more protrusions 308 may protrude inwardly from an otherwise planar edge surface of the capture wall 304, as shown in FIG. 3B. The one or more protrusions 308 are sized to engage the one or more grooves 208 of the connection wall 204 of the first component 106 when the connection wall 204 is oriented in the second orientation within the capture wall 304. In an embodiment, the combination of the capture wall 304 and the one or more protrusions 308 function together as the female connection portion.

In an embodiment, each of the one or more protrusions 308 has a leading end 310, which slides in the lead (i.e., first) into a corresponding one of the one or more grooves 208 when the rotational twist action is performed. Further, each of the one or more protrusions 308 has a stopping end 312, which ends the respective protrusions 308 abruptly, for example, at a portion of the inner surface of the capture wall 304 such that the first component 106 is prevented from further movement in the direction of twist when the rotational twist action is performed. Thus, when a groove 208 abuts the stopping end 312 of a corresponding protrusion 308, the fastenerless connection feature is in the second orientation and the first component 106 and the second component 108 are considered fastened together.

For the sake of completeness and clarity, the follow additional aspects, which are similar to the features of the first component 106 described above are presented here with respect to the second component 108, and where necessary, points of distinction are made.

Accordingly, for the purposes of this disclosure, it is considered to be understood by those skilled in the art that the term "transverse" means that the direction of extension of the capture wall 304 includes any direction other than parallel to the backing structure 302. Further, it is considered to be understood by those skilled in the art that the term "substantially" in this context indicates that the direction of extension of the capture wall 304 extends at an angle that ranges between 10 degrees in either direction of being orthogonal to the backing structure 302 (i.e., the angle between adjacent surfaces of the front panel 302 and the capture wall 304 may vary from 80° to 100°).

Figure 3A:
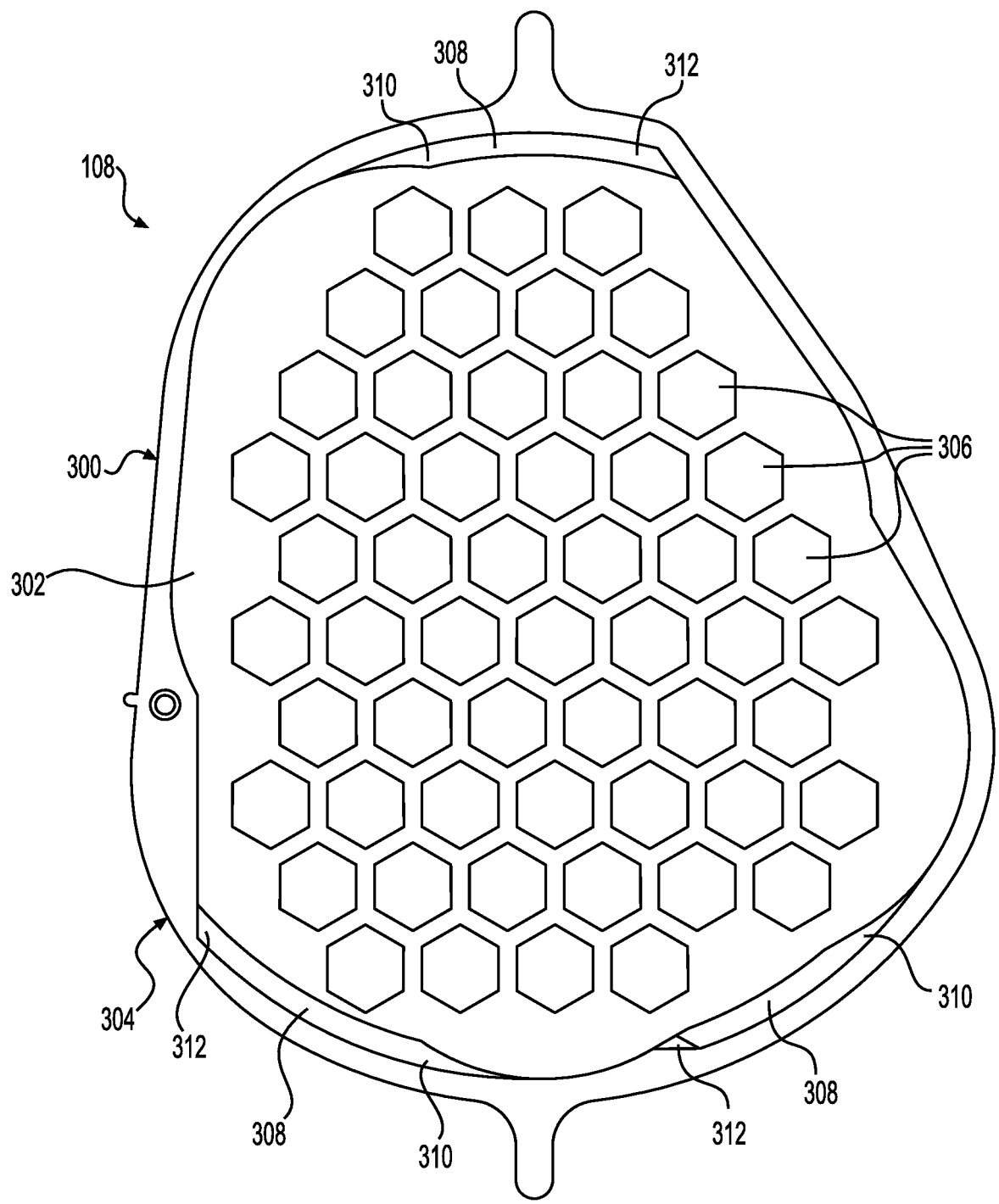
FIG. 3A illustrates a rear view of a cover of the facemask depicted in FIGS. 1A-1F, as another example component of an apparatus having a fastenerless connection portion, according to an embodiment of this disclosure.
Figure 3B:
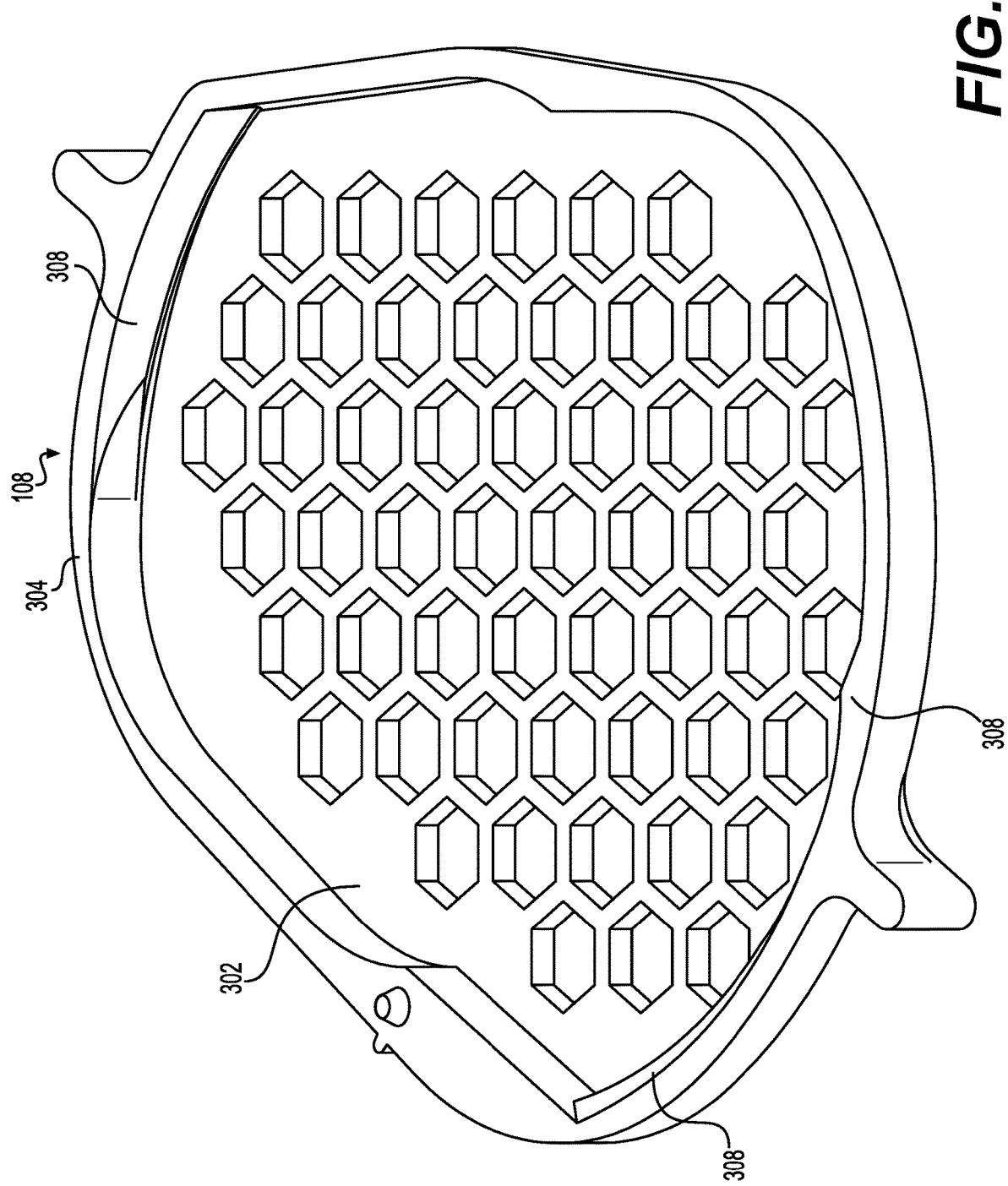
FIG. 3B illustrates a perspective view of the cover of the facemask depicted in FIG. 3A, according to an embodiment of this disclosure.

The capture wall 304 may follow a path of a perimeter of the backing structure 302 so as to be a perimeter wall that extends around the outer border of the backing structure 302, as is depicted in FIG. 3A. Further, the capture wall 304 may be one continuous wall structure (as depicted) or an aligned set of discontinuous wall segments (not depicted) that track along a perimeter line of the backing structure 302. Alternatively, the capture wall 304 may be a wall (continuous or discontinuous) that closely tracks approximately, but is not definitive of, the outermost perimeter around the backing structure 302. In this alternative embodiment, a portion of the backing structure 302 may extend a distance beyond an outer side of the capture wall 304 by a predetermined width, which may vary along the component, and need not be a constant width.

Moreover, in an alternative embodiment contemplated as within the scope of this disclosure, the capture wall may follow an endless pathway that does not track a perimeter line of the backing structure at all. In other words, the capture wall may extend along a portion of the body of the second component that does not mirror an underlying shape or outline of the backing structure of the second component at all. For example, it is contemplated that a component of an apparatus may include a diamond shaped connection wall, while the shape of the backing structure is oval shaped. Nevertheless, as indicated above, the shape of the capture wall of the second component corresponds closely with the shape of the first component, with an exception as described below.

Regardless of the shape of the backing structure 302, the capture wall 304 rises therefrom and—like the first component—may define a non-circular, closed-geometric shape. As stated above, for the purposes of this disclosure, the term "non-circular, closed-geometric shape" is defined as any shape having a continuously-definable border forming an endless pathway, for which the distance from the centroid of the shape to a point on the border is not constant for all points along the border (i.e., no constant radius, and thus no circles). Additionally, for the purposes of this disclosure, the shape formed by the capture wall is determined in a two-dimensional plane as the profile shape of the closed pathway followed by the capture wall.

While the shape of the connection wall 204 of the first component 106 may take any of the non-circular, closed-geometric shapes discussed above, the shape of the capture wall 304 of the second component 108 accommodates the insertion of the shape and size of the connection wall 204 in a first orientation in a plane and the same shape and size of the connection wall 204 in the rotated second orientation.

Accordingly, the shape of the capture wall 304 may be generally defined as an irregular polygon as depicted, although there may be shapes with which the capture wall 304 may appear as a regular polygon. That is, the shape of the capture wall 304 along an interior surface may have no line of symmetry.

In an embodiment, the shape of the connection wall 204 may be polygonal and have three or more sides such that the connection wall 204 includes a vertex position at each angle between adjacent sides of three or more sides of the connection wall 204. It is contemplated that the connection wall 204 thus includes at least a first vertex position, a second vertex position, and a third vertex position. Further, where the second component 108 includes at least two grooves 308 on the capture wall 304, when fastened together, the first component 106 and the second component 108 are oriented such that a first groove is located at the first vertex position of the connection wall 204, and a second groove is located at one of the second vertex position or the third vertex position. In an alternative embodiment, it is contemplated that only two vertices will engage with respective grooves, where the pairs are considered to be on opposing sides to provide sufficient fastening ability. However, it is contemplated that a single groove engaged with a single protrusion may be sufficient as well.

In an embodiment, a method of assembling an apparatus having multiple components that are interconnectable without fasteners is considered. Such a method may include steps of orienting the connection wall of the first component in the first orientation within the second component; and performing the rotational twist action such that the first component is twisted in a plane with respect to the second component to align the one or more grooves of the first component with the one or more protrusions of the second component to be in the fastened state of the second orientation. Moreover, in an embodiment, the step of performing the rotational twist action includes twisting the first component with respect to the second component until: the respective leading end of the one or more protrusions engages a corresponding groove of the one or more grooves, or the respective stopping end of the one or more protrusions engages an end of the corresponding groove of the one or more grooves.

Additionally, and/or alternatively, the step of performing the rotational twist action may include forming a cavity within the apparatus and between the first component and the second component.

Therefore, in an example of an apparatus of the facemask, the first component 106 may be a tray to hold a filter and the second component 108 may be a cover for enclosing the filter against the tray for breathing through the facemask.

CONCLUSION

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. An apparatus having multiple components that are interconnectable without fasteners, comprising:
    a first component including a male connection portion including:
        a connection wall defining a non-circular, closed-geometric shape, and
        one or more grooves extending along at least a portion of an outer side of the wall, the one or more grooves being recessed from an edge surface of the wall; and
    a second component including a female connection portion configured to connect with the male connection portion, the female connection portion including:
        a capture wall defining a shape within which the connection wall of the male connection portion fits in a first orientation and a second orientation, the first orientation being an unfastened state between the first component and the second component, and the second orientation being a fastened state achieved via a rotational twist action of the first component with respect to the second component after the first component is fitted in the first orientation, and
        one or more protrusions protruding inwardly from the capture wall, the one or more protrusions sized to engage the one or more grooves of the connection wall of the first component when the connection wall is oriented in the second orientation within the capture wall,
    wherein the shape of the connection wall is polygonal having three or more sides such that the connection wall includes a vertex position at each angle between adjacent sides of three or more sides of the connection wall, whereby the connection wall includes at least a first vertex position, a second vertex position, and a third vertex position.

2. The apparatus according to claim 1, wherein the connection wall of the first component is sized such that the first orientation permits insertion of the first component into the second component and removal of the first component from the second component without interference between the connection wall and the capture wall.

3. The apparatus according to claim 1, wherein the shape of the capture wall is defined by a continuous wall structure.

4. The apparatus according to claim 1, wherein the shape of the capture wall is defined by a plurality of discontinuous wall structures, where each wall structure extends along a part of a connection boundary of the shape of the capture wall.

5. The apparatus according to claim 1, wherein the one or more grooves includes at least two grooves, and
    wherein a first groove is located at the first vertex position of the connection wall, and a second groove is located at one of the second vertex position or the third vertex position.

6. The apparatus according to claim 1, wherein the shape of the connection wall and the shape of the capture wall are two-dimensional shapes, respectively.

7. The apparatus according to claim 1, wherein the first orientation and the second orientation are defined on a same plane such that a spatial proximity relationship between the first component and the second component remains constant when the first component and the second component are in the first orientation or in the second orientation.

8. An apparatus having multiple components that are interconnectable without fasteners, comprising:
  a first component including a male connection portion including:
    a back plate,
    a wall rising from the back plate and defining a non-circular, closed-geometric shape, and
    one or more grooves extending along at least a portion of an outer side of the connection wall; and
  a second component including a female connection portion configured to connect with the male connection portion, the female connection portion including:
    a front plate,
    a capture wall rising from the front plate and defining a shape within which the connection wall of the male connection portion fits in a first orientation and a second orientation, the first orientation being an unfastened state between the first component and the second component, and the second orientation being a fastened state achieved via a rotational twist action of the first component with respect to the second component after the first component is fitted in the first orientation, and
    one or more protrusions extending inwardly from the capture wall, the one or more protrusions sized to engage the one or more grooves of the connection wall of the first component when the connection wall is oriented in the second orientation within the capture wall.

9. The apparatus according to claim 8, wherein an upper edge surface of the connection wall rests against the front plate when the first component and the second component are in the first orientation.

10. The apparatus according to claim 8, wherein the back plate and the front plate include one or more throughholes, respectively.

11. The apparatus according to claim 8, wherein the shape of the capture wall along an interior surface has no line of symmetry.

12. The apparatus according to claim 8, further comprising a third component, wherein the first component and the second component are configured to entrap the third component therebetween when positioned in the second orientation.

13. The apparatus according to claim 12, wherein the third component is a mask body, the first component is a filter tray, and the second component is a filter cover.

14. The apparatus according to claim 8, wherein the first component and the second component form a cavity therebetween when positioned in the second orientation.

15. The apparatus according to claim 8, wherein the shape of the connection wall is pentagonal having five sides and five angles such that the connection wall includes a vertex position at each angle between adjacent sides, whereby the connection wall includes a first vertex position, a second vertex position, a third vertex position, a fourth vertex position, and a fifth vertex position, sequentially.

16. The apparatus according to claim 15, wherein the one or more grooves includes at least two grooves, and
  wherein a first groove is located at the first vertex position of the connection wall, and a second groove is located at one of the third vertex position or the fourth vertex position.

17. A method of assembling an apparatus having multiple components that are interconnectable without fasteners, the apparatus including:
  a first component including a male connection portion including:
    a connection wall defining a non-circular, closed-geometric shape, and
    one or more grooves extending along at least a portion of an outer side of the connection wall, the one or more grooves being recessed from an edge of the connection wall, and
  a second component including a female connection portion configured to connect with the male connection portion, the female connection portion including:
    a capture wall defining a shape within which the connection wall of the male connection portion fits in a first orientation and a second orientation, the first orientation being an unfastened state between the first component and the second component, and the second orientation being a fastened state achieved via a rotational twist action of the first component with respect to the second component after the first component is fitted in the first orientation, and
    one or more protrusions extending inwardly from the capture wall, the one or more protrusions sized to engage the one or more grooves of the connection wall of the first component when the connection wall is oriented in the second orientation within the capture wall,
  and the method comprising steps of:
    orienting the connection wall of the first component in the first orientation within the second component;
    interposing a third component between the first component and the second component; and
    performing the rotational twist action such that the first component is twisted in a plane with respect to the second component to align the one or more grooves of the first component with the one or more protrusions of the second component to be in the fastened state of the second orientation, whereby the third component is held in place between the first component and the second component.

18. The method according to claim 17, wherein each of the one or more protrusions has a leading end and a stopping end, and
  wherein the step of performing the rotational twist action includes twisting the first component with respect to the second component until:
    the respective leading end of the one or more protrusions engages a corresponding groove of the one or more grooves, or
    the respective stopping end of the one or more protrusions engages an end of the corresponding groove of the one or more grooves.

19. The method according to claim 17, wherein the step of performing the rotational twist action includes forming a cavity within the apparatus and between the first component and the second component.

* * * * *